United States Patent [19]
Ishiguro et al.

[11] Patent Number: 5,467,431
[45] Date of Patent: Nov. 14, 1995

[54] METHOD AND APPARATUS FOR CONTROLLING HIGH SPEED PRINTING

[75] Inventors: Hajime Ishiguro; Kazutoshi Morioka, both of Kawasaki; Tooru Sakai; Yasushi Takemura, both of Kahoku, all of Japan

[73] Assignees: Fujitsu Limited, Kanagawa; PFU Limited, Ishikawa, both of Japan

[21] Appl. No.: 277,566

[22] Filed: Jul. 20, 1994

[30] Foreign Application Priority Data

Jul. 20, 1993 [JP] Japan ................. 5-178657

[51] Int. Cl.$^6$ ................................. G06F 3/12
[52] U.S. Cl. ........................... 395/102; 395/115
[58] Field of Search ................. 395/102, 101, 395/115, 117, 600, 116, 107; 400/76, 708

[56] References Cited

U.S. PATENT DOCUMENTS

| | | | |
|---|---|---|---|
| 5,033,880 | 7/1991 | Kageyama et al. | 400/76 |
| 5,204,959 | 4/1993 | Sakuragi | 395/102 |
| 5,265,209 | 11/1993 | Kageyama et al. | 395/102 |
| 5,270,831 | 12/1993 | Parulski et al. | 358/403 |
| 5,311,259 | 5/1994 | Moriya et al. | 355/243 |
| 5,316,396 | 5/1994 | Fukaya | 395/102 |
| 5,324,122 | 6/1994 | Kobayakawa | 395/116 |
| 5,361,329 | 11/1994 | Morita et al. | 395/102 |

FOREIGN PATENT DOCUMENTS 2-157926  6/1990  Japan.

Primary Examiner—Mark R. Powell
Assistant Examiner—Steven P. Sax
Attorney, Agent, or Firm—Nikaido, Marmelstein, Murray & Oram

[57] ABSTRACT

When the size of a printing paper is smaller than a half of the whole area used for expanding the printing data, a method and apparatus for controlling high speed printing in a printer device, having a bit-map memory, a data transfer circuit for transferring video data on the bit-map memory to a printer, and a copying unit for copying the dot-data within a rectangular region on the bit-map memory, include copying the dot-data expanded in a first area on the bit-map memory into a second area that does not overlap with the first area; and sending the dot-data to the printer, and simultaneously expanding the printing data of the next page in the first area. When the size of a printing paper is smaller than the whole area, the method and apparatus include copying the dot-data expanded in a first area on the bit-map memory into a second area that overlaps with the first area in one part; sending the dot-data to the printer; and expanding the printing data of the next page in the first area partially in parallel.

14 Claims, 13 Drawing Sheets

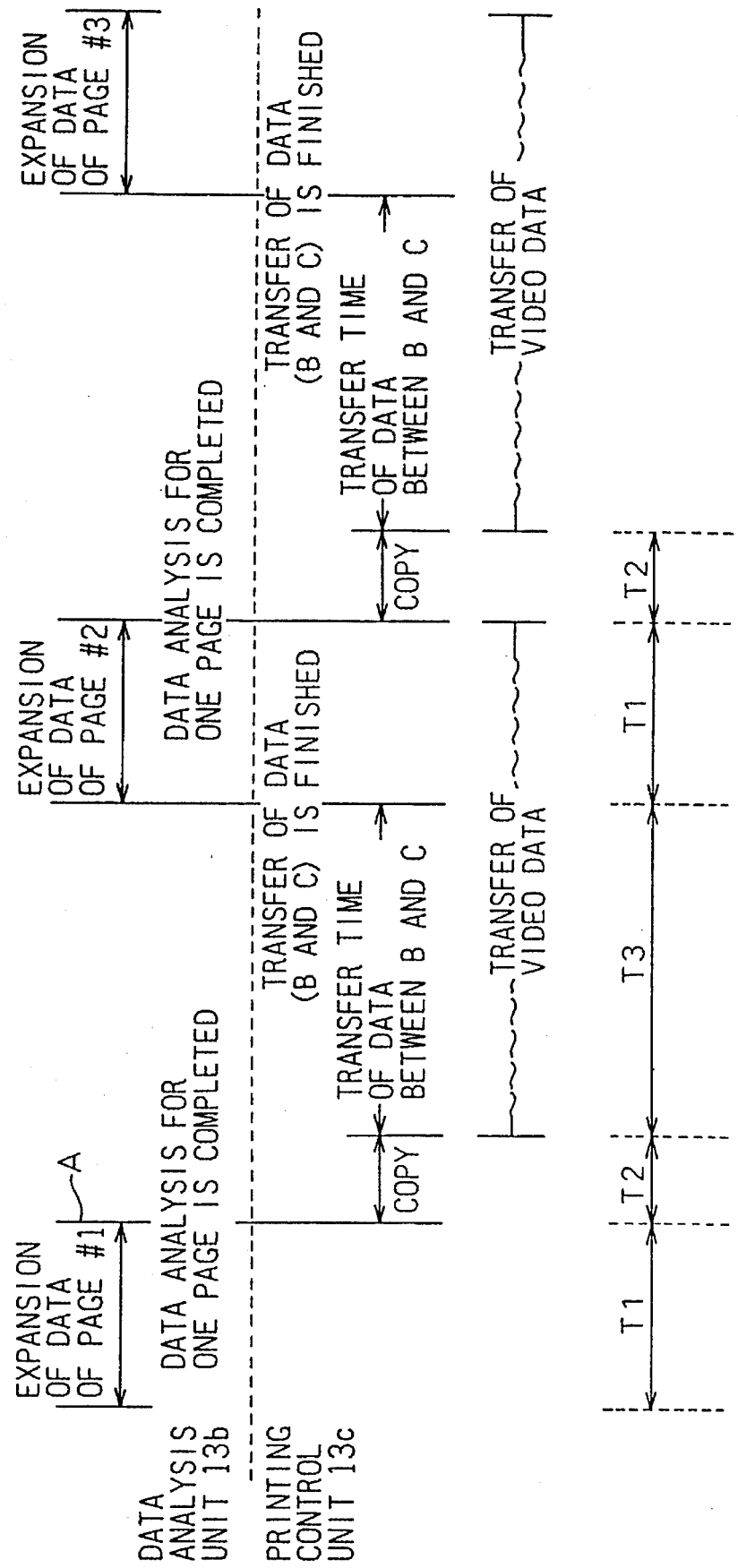

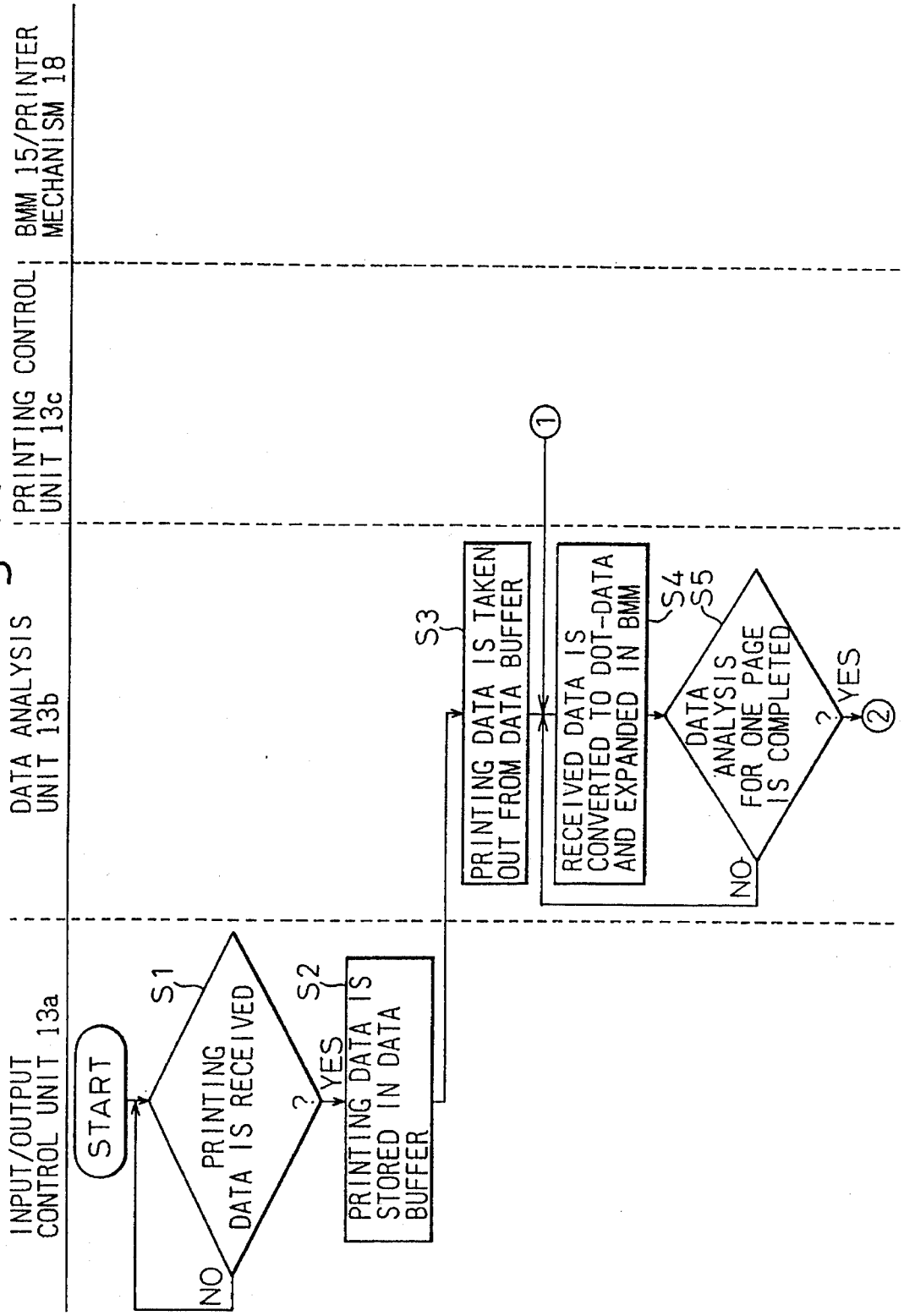

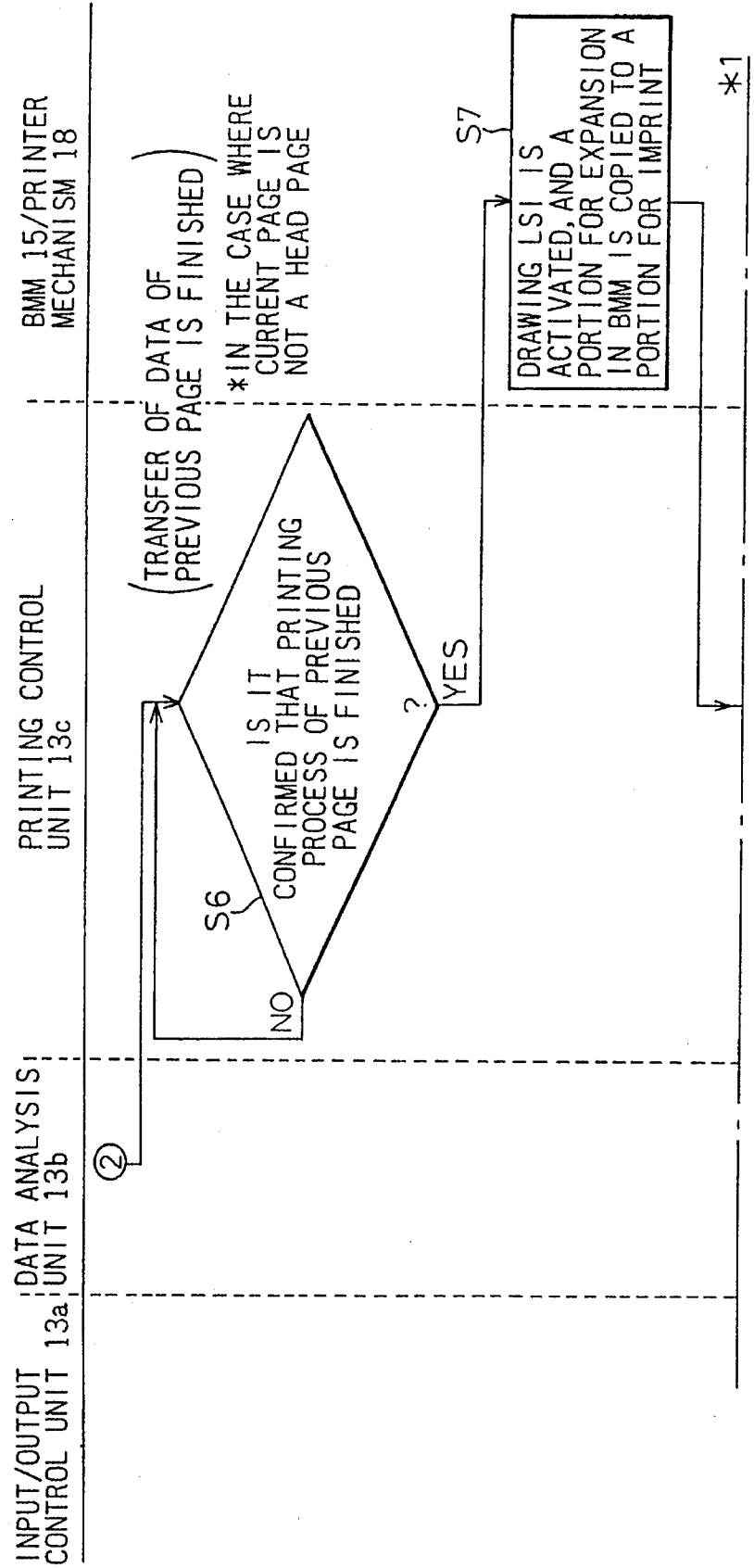

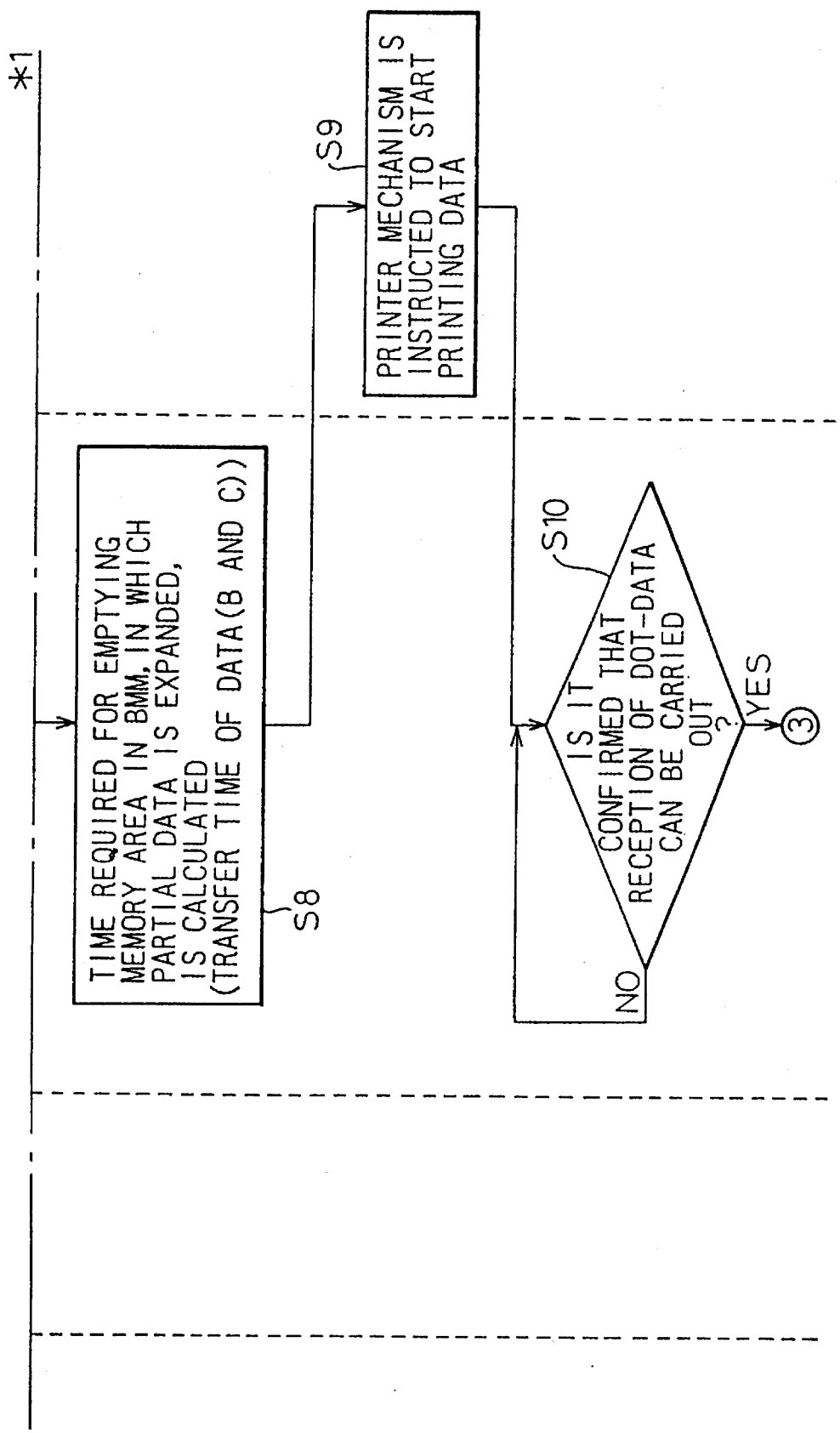

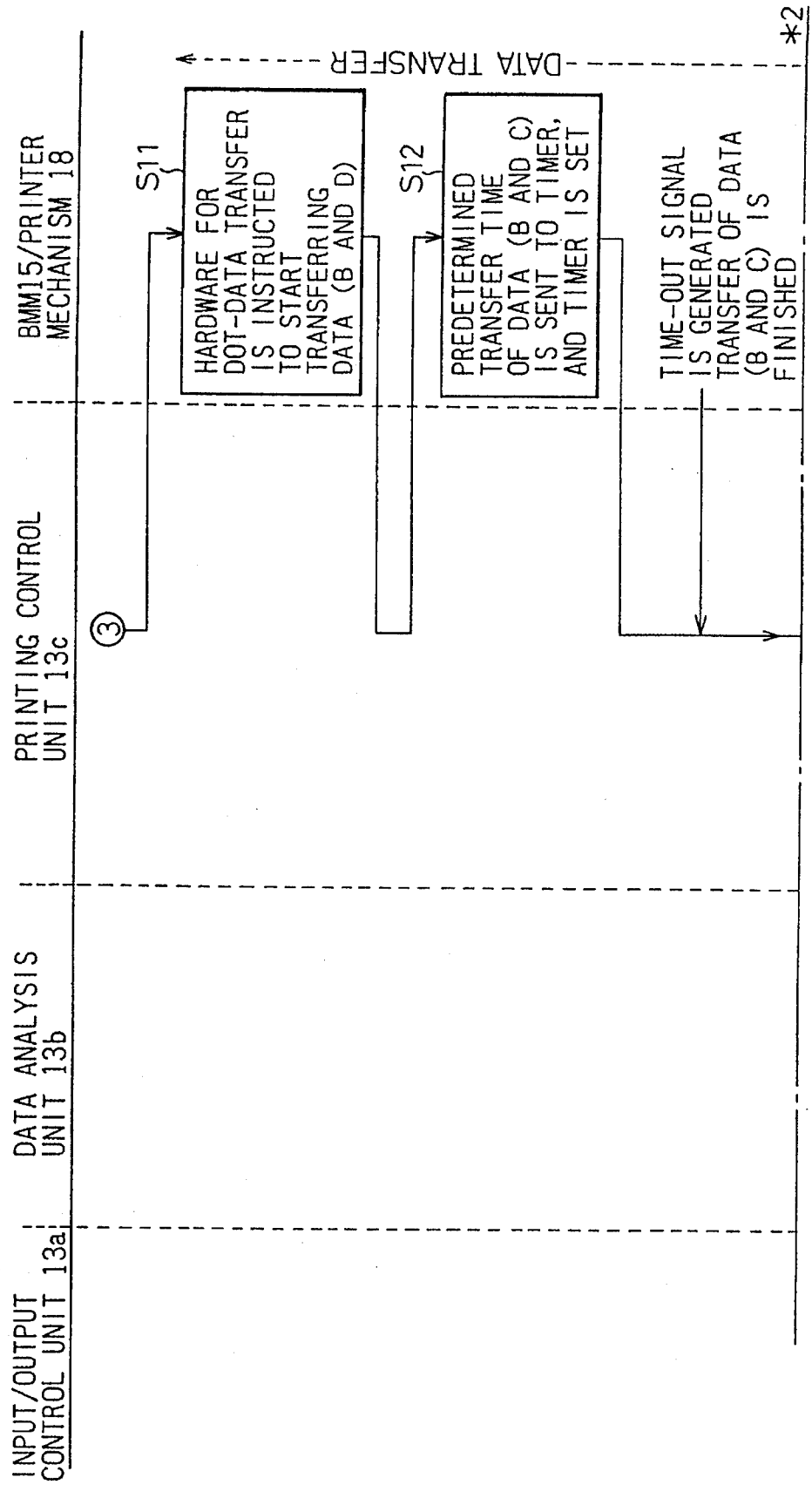

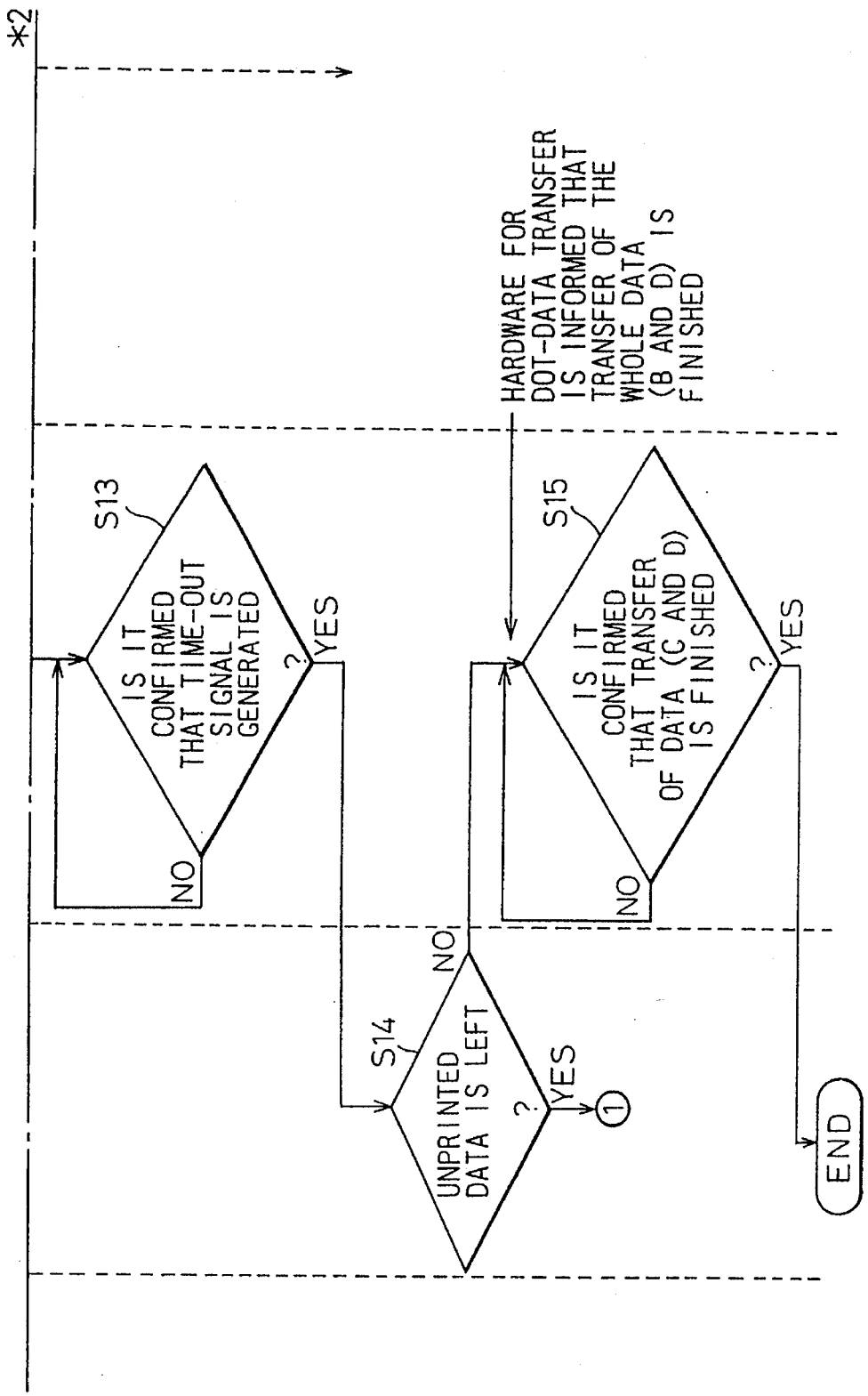

METHOD AND APPARATUS FOR CONTROLLING HIGH SPEED PRINTING

BACKGROUND OF THE INVENTION

1. Field of the Invention

The present invention relates to a method and apparatus for controlling high speed printing in a printer device which is connected to a computer system.

In recent years, a small-scaled computer system, represented by a personal computer, a work-station, or the like, tends to have relatively high functions. Also, a processing performance of the above-mentioned personal computer, etc., has been remarkably improved so as to satisfy various requirement of users.

With the advance of functions and processing performance of such a small-scaled computer system, peripheral devices connected to the computer system have been required to operate with a processing speed as high as data transferred from the computer system can be adequately processed.

Especially, in a printer device including a printer mechanism, which is representative of the peripheral devices, a conventional impact printer having continuous forms has been rapidly replaced with a non-impact printer (e.g., laser printer) having cut forms, in view to an increase of a printing speed and a reduction of mechanical noises.

2. Description of the Related Art

In regard to the above-mentioned non-impact printer having cut forms, which is utilized by connecting to a computer system, e.g., work-station, it is strongly desired that requirements for higher printing speed and lower cost for production should be simultaneously satisfied. In other words, to produce a non-impact printer having relatively high printing speed, it becomes necessary for a printer mechanism operating with sufficiently high speed to be developed, and also necessary for a printing control process by means of such a printer mechanism to be carried out with sufficiently high efficiency.

In a well-known method and apparatus for controlling a printer device, a microprocessor is provided in the printer device per se, or in an external controller. Usually, such a microprocessor is adapted to receive various interrupt signals, and to adequately treat these interrupt signals so as to carry out a control process of the whole printer device.

In such a printer device, the maximum (highest) printing speed is generally determined by a performance of a printer mechanism, i.e., printer engine. However, in order to maintain this maximum printing speed, it is necessary for printing data that is to be processed with a high speed substantially conforming to the maximum printing speed. In this viewpoint, the following two techniques for controlling high speed printing in a printer device have been heretofore adapted.

(1) In a first case, two kinds of bit-map memories (hereinafter, each bit-map memory will be sometimes abbreviated to BMM) are provided. While dot-data in one of these BMMs is transferred to the printer mechanism, printing data of the next page, which is sent from a host processor, is converted to corresponding dot-data. Subsequently, the corresponding dot-data is expanded in the remaining bit-map memory. According to such a first technique, the time necessary for expanding printing dada in each bit-map memory can be reduced, and therefore it becomes possible to maintain the maximum printing speed.

(2) In a second case, by utilizing spare time between the timing of completion of a process for transferring dot-data in one bit-map memory to the printer mechanism and the timing of start of transferring printing data of the next page, such printing data of the next page is converted to corresponding dot-data and expanded in the bit-map memory. According to such a second technique, the time necessary for expanding printing dada in the BMM can be also reduced, and it also becomes possible to maintain the maximum printing speed.

Here, a description regarding the above-mentioned spare time in the second technique will be given more specifically. As soon as a microprocessor in the printer device or an external controller takes out dot-data from a BMM and simultaneously sends an activation signal to the printer mechanism, this printer mechanism picks up a paper in a form feeding tray and carries out a heading process of the printing paper. Subsequently, the printer mechanism sends a transfer request signal for requesting to transfer the dot-data in the BMM to the microprocessor or the like.

Further, the microprocessor or the like receives this transfer request signal, and transfers the dot-data in the BMM to the printer mechanism. In this case, the so-called spare time as long as one second is usually generated, since the printer mechanism must pick up the printing paper in the form feeding tray during the time period between the time when a process for transferring the current dot-data to the printer mechanism is completed and the time when a process for transferring the next dot-data is started.

In the above-mentioned second technique (2), before the dot-data of each page is actually expanded, the time necessary for expanding the dot-data of a given page is calculated in advance (usually referred to as an order analysis or an analysis for data expansion). Further, it is examined whether or not the dot-data can be expanded in the BMM during the above-mentioned spare time. In the case where it is determined that the dot-data can be expanded in the BMM during the spare time, a process for expanding the dot-data in the BMM is actually executed during the spare time.

A method for starting up high speed printing in a printer device by utilizing such a second technique (2) is disclosed in a Japanese Unexamined Patent Publication (Kokai) No. 2-157926 (Japanese Patent application No. 63-312526) filed by the same applicant (Fujitsu limited).

Further, problems regarding the above-mentioned two techniques for controlling high speed printing in a printing device will be described.

In the first technique (1), it is necessary for two memory cards of bit-map memories (BMMs) to be prepared. Therefore, the amount of hardware for constituting these BMMs increases up to the amount twice as large as the case in which a single BMM is used. Consequently, the first technique has a disadvantage that cost for fabricating an apparatus for controlling printing is likely to increase owing to two kinds of BMMs.

On the contrary, in the second technique (2), since a single BMM is utilized, the amount of hardware can be smaller than that in the first technique (1). However, in this case, the higher a printing speed of the printer mechanism becomes, the shorter the time required for printing one page becomes. As the time for printing one page decreases, the time required for picking up a printing paper is likely to be reduced. Namely, the spare time, which is defined as the time period between the time when a process for transferring the current dot-data to the printer mechanism is completed and the time when a process for transferring the next dot-data is started, also decreases.

Therefore, a microprocessor or the like does not have enough time to convert printing data of the next page to corresponding dot-data and to expand the thus converted dot-data in the BMM. Consequently, the second technique has a disadvantage that it becomes difficult to expand the dot-data in the BMM during the spare time with the improvement of the printing speed of the printer mechanism.

SUMMARY OF THE INVENTION

In view of the above-described problems, the main object of the present invention is to provide a method and apparatus for controlling high speed printing in a printer device, in which a printing process can be executed with a printing speed as high as the case in which two kinds of BMMs are included without necessity for the two kinds of BMMs.

A further object of the present invention is to provide a method and apparatus for controlling high speed printing in a printer device, in which requirements for higher printing speed and lower cost for fabricating the printer device can be simultaneously satisfied.

A still further object of the present invention is to provide a method and apparatus for controlling high speed printing in a printer device, in which there is enough time to convert printing data of one page to dot-data and to expand the thus converted dot-data in the BMM during the spare time, even in the case where a printing speed of a printer mechanism in the printer device remarkably increases.

A still further object of the present invention is to provide a method and apparatus for controlling high speed printing in a printer device, in which a performance that a printer mechanism has can be utilized to the maximum.

A still further object of the present invention is to provide a method and apparatus for controlling high speed printing in a printer device, in which a process for expanding dot-data in a BMM and a process for transferring the thus expanded dot-data to a printer mechanism can be executed with high efficiency.

To attain these objects, the method for controlling high speed printing in a printer device, which has a bit-map memory which generates dot-data which can be output as necessary video data, a data transfer circuit which allows video data to be transferred from at least two positions on the bit-map memory to a printer constituting a mechanical part of the printer device, and a copying unit which allows the dot-data existing within a given rectangular region on the bit-map memory to be copied into any other rectangular region on the bit-map memory, includes the following steps in two cases.

In the first case, the method includes a step of copying the dot-data which is expanded in a first area on the bit-map memory into a second area that does not overlap with the first area, and a step of sending the thus copied dot-data to the printer as the video data, and simultaneously, expanding the printing data of the next page in the first area. Namely, a process for transferring the video data to the printer and a process for expanding the printing data of the next page in the first area are carried out substantially in parallel.

In the second case, the method includes a step of copying the dot-data which is expanded in a first area on the bit-map memory into a second area that overlaps with the first area in at least one part thereof, a step of sending the thus copied dot-data in the part of the second area that overlaps with the first area to the printer as the video data, and a step of sending the thus copied dot-data in the part of the second area that does not overlap with the first area to the printer as the video data and expanding the printing data of the next page in the first area. Namely, a process for transferring the video data in the part of the second area that does not overlap with the first area to the printer and a process for expanding the printing data of the next page in the first area are carried out partially in parallel.

Preferably, in the method applied to the above-mentioned second case, an analysis for data expansion of the next page is executed during the time period between the time when the process for transferring the video data to the printer is started and the time when the process for expanding the printing data of the next page in the first area is allowed to be executed.

Further, when it is detected that a new page should be used within the time period as a result of the analysis, a paper of the next page is inhaled in advance of the process for expanding the printing data of the next page. Namely, a process for inhaling a paper of the next page and the process for transferring the video data to the printer are carried out in parallel.

Further, preferably, in the method for controlling high speed printing in such a printer device, at least one procedure is selected among the following three types of procedures (A), (B) and (C), in accordance with the size of a printing paper which is used for printing the video data and the whole area which can be used for expanding the printing data of the current page in the bit-map memory as corresponding dot-data.

(A) A first procedure comprising a step of copying the dot-data which is expanded in a first area on the bit-map memory into a second area that does not overlap with the first area, and a step of sending the thus copied dot-data to the printer as the video data, and simultaneously, expanding the printing data of the next page in the first area (B) A second procedure comprising a step of copying the dot-data which is expanded in a first area on the bit-map memory into a second area that overlaps with the first area in at least one part thereof, a step of sending the thus copied dot-data in the part of the second area that overlaps with the first area to the printer as the video data, and a step of sending the thus copied dot-data in the part of the second area that does not overlap with the first area to the printer as the video data and expanding the printing data of the next page in the first area (C) A third procedure comprising a step of executing an analysis for data expansion of the next page during the time period between the time when the process for transferring the video data to the printer is started and the time when the process for expanding the printing data of the next page in the first area is allowed to be executed, and a step of inhaling a paper of the next page in advance of the process for expanding the printing data of the next page, in the case where it is detected that a new page should be used within the time period as a result of the analysis Further, preferably, the apparatus for controlling high speed printing in the above-mentioned printing device has a control unit for controlling operations of the data transfer circuit and the copying unit.

Under the condition corresponding to the above-mentioned first case, the control unit includes means for copying the dot-data which is expanded in a first area on the bit-map memory into a second area which does not overlap with the first area, and means for sending the thus copied dot-data to the printer as the video data and expanding the printing data of the next page in the first area. Further, the control unit allows a process for transferring the video data to the printer and a process for expanding the printing data of the next page in the first area to be carried out substantially in parallel.

Under the condition corresponding to the above-mentioned second case, the control unit includes means for copying the dot-data which is expanded in a first area on the bit-map memory into a second area which overlaps with the first area in at least one part thereof, and means for sending the thus copied dot-data to the printer as the video data and expanding the printing data of the next page in the first area. Further, the control unit allows a process for transferring the video data to the printer and a process for expanding the printing data of the next page in the first area to be carried out partially in parallel.

Further, preferably, the control unit further includes means for carrying out an analysis for data expansion of the next page during the time period between the time when the process for transferring the video data to the printer is started and the time when the process for expanding the printing data of the next page in the first area is allowed to be executed.

In the case where it is detected that a new page should be used within the time period as a result of the analysis, the printer inhales a paper of the next page in advance of the process for expanding the printing data of the next page. Further, the control unit allows a process for inhaling a paper of the next page and the process for transferring the video data to the printer to be carried out in parallel.

In a preferred embodiment of the present invention, the control unit is realized by a central processing unit (CPU) in a computer system.

In the method and apparatus for controlling printing according to the present invention, a special attention is paid to the point that the largest size of an available paper (e.g., the size of A3 or B4 in JIS standard) does not always conform to the size of a printing paper which has the highest frequency in general use of printing (e.g., the size of A4 in JIS standard).

In view of this point, according to the present invention, the size of a paper which enables the printer mechanism of the printer device to maintain the maximum printing speed is designed to be smaller than the largest size, i.e., the maximum size that can be treated by the printer device. Further, the BMM is used by dividing the the whole area thereof into a first area for expanding printing data as dot-data and a second area for transferring the thus expanded dot-data. Therefore, a deterioration of a performance of printing in the printer device can be suppressed to the minimum.

In such a technique, if the size of a printing paper is smaller than a half of the maximum size that can be treated by the printer device (e.g., the first case), it becomes possible for a printing speed as high as the case in which two kinds of BMMs are provided to be obtained by using a single BMM.

On the other hand, if the size of a printing paper is smaller than the maximum size that can be treated by the printer device, but larger than a half of the maximum size (e.g., the second case), the time required for expanding printing data can be reduced even in the case where a single BMM is used. Consequently, according to the present invention, it becomes possible to increase the printing speed, in comparison with the prior art.

Further, in the case where the maximum printing speed of the printer mechanism is to be maintained, it should be noted that the time required for inhaling a printing paper from a form feeding tray through the inside of the printer device is not be negligible. On the other hand, it may have a disadvantageous influence on the quality of printed characters, the life of consumables, and the like, that the printing paper is kept inhaled to the inside of the printer device for a long time. Therefore, it is generally desirable not to inhale a printing paper of the next paper from a form feeding tray, before it is confirmed that a process for expanding printing data in a BMM as corresponding dot-data (i.e., bit-map data) is completed.

In a technique for controlling printing according to the present invention, an order analysis for data expansion of the next page is carried out while a portion of the thus expanded dot-data is being transferred to a printer, i.e., a printer mechanism.

Further, in this case, only when it is detected that a new page should be used as a result of the data analysis, a control unit instructs the printer mechanism to inhale a printing paper of the next page in advance of the process for expanding the printing data of the next page.

By virtue of such a control technique, it becomes possible for a process for inhaling a printing paper of the next page and a process for transferring dot-data to a printer mechanism to be carried out in parallel, in the condition that the printing paper is prevented from remaining inhaled to the inside of the printer device for a long time.

BRIEF DESCRIPTION OF THE DRAWINGS

The above objects and features of the present invention will be more apparent from the following description of the preferred embodiments with reference to the accompanying drawings, wherein:

FIG. 10 is a time chart for explaining an operation of a data analysis unit and a printing control unit in the case of FIG. 9;

FIG. 11 is a flowchart for explaining a first part of a procedure for controlling printing in the case of FIG. 9.

FIGS. 12A and 12B are flowcharts for respectively explaining a second part and a third part of a procedure for controlling printing in the case of FIG. 9;

FIGS. 13A and 13B are flowcharts for respectively explaining a fourth part and a fifth part of a procedure for controlling printing in the case of FIG. 9.

DESCRIPTION OF THE PREFERRED EMBODIMENTS

Hereinafter, a description of some preferred embodiments according to the present invention will be given with reference to the accompanying drawings.

Figure 1:
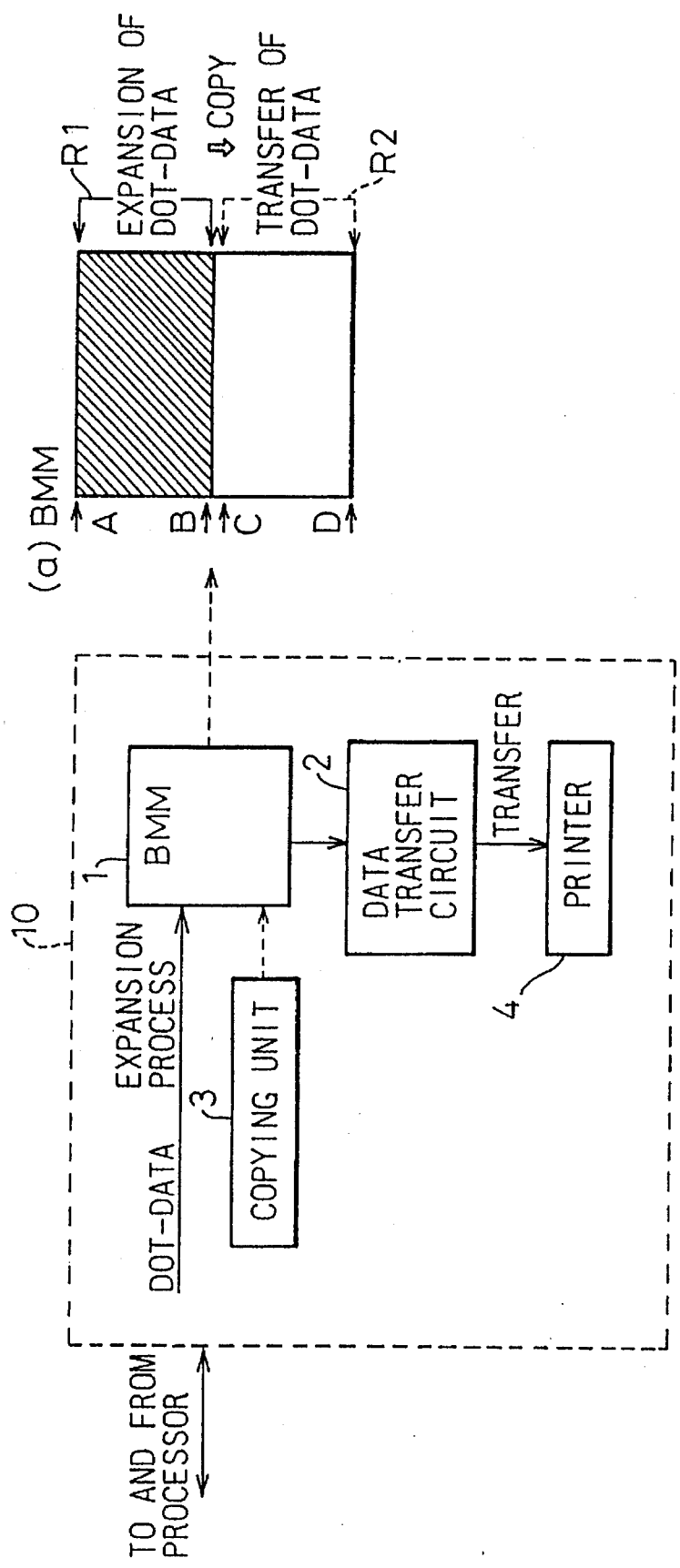
FIG. 1 is a schematic block diagram showing one essential embodiment of the principle of the present invention.
Figure 2:
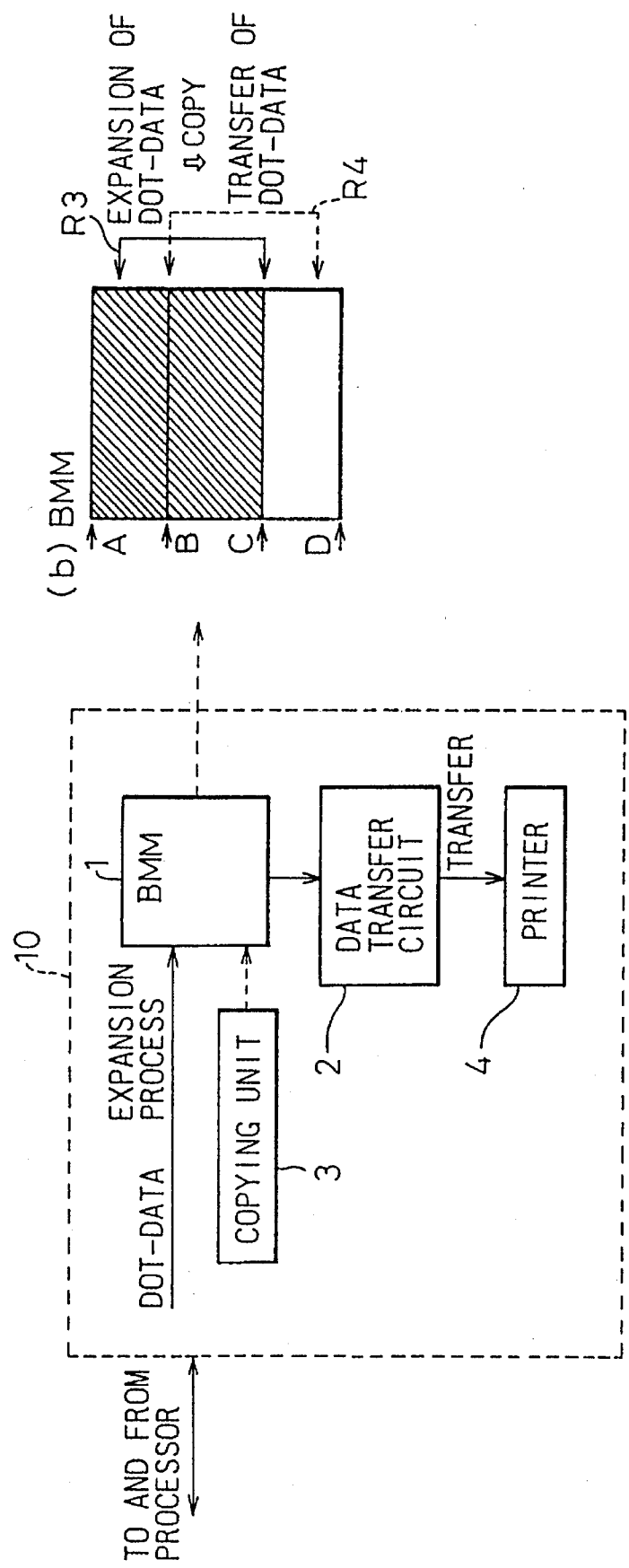
FIG. 2 is a schematic block diagram showing another essential embodiment of the principle of the present invention.

FIG. 1 is a schematic block diagram showing one essential embodiment of the principle of the present invention; FIG. 2 is a schematic block diagram showing another essential embodiment of the principle of the present invention.

In each case, the whole construction of a printer device 10 including a control unit is schematically illustrated, so that the basic principle of the present invention can be easily understood.

In FIG. 1 or FIG. 2, 1 denotes a bit-map memory (BMM) which generates dot-data that can be output as necessary video data, on the basis of printing data which is to be printed. 2 denotes a data transfer circuit which allows such video data to be transferred from at least two positions on the BMM 1 to a printer 4.

The printer 4 is substantially equivalent to a printer mechanism that will be hereinafter described.

Figure 3:
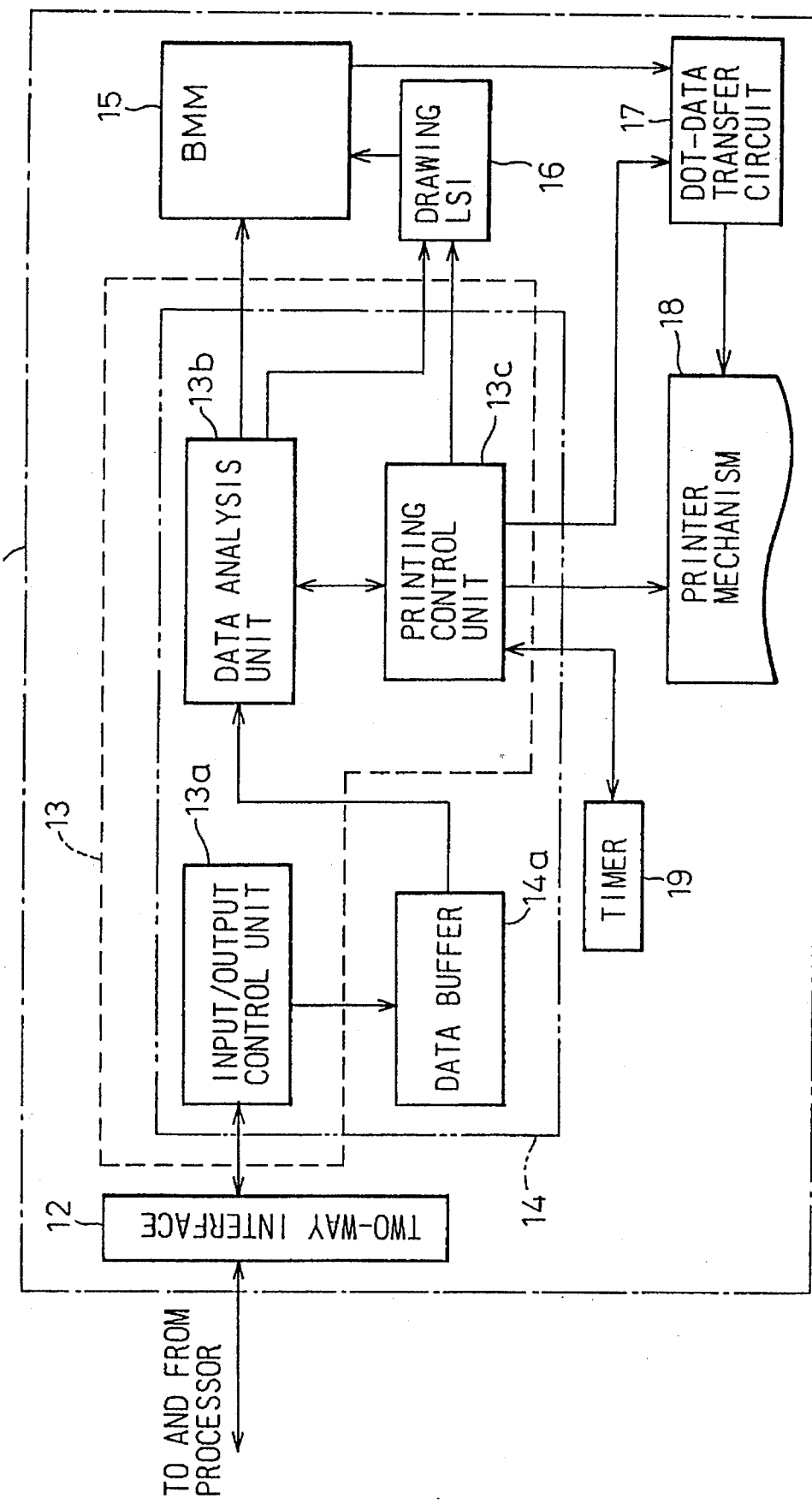
FIG. 3 is a block diagram showing a first preferred embodiment according to the present invention.

Further, in FIG. 1 or FIG. 2, 3 denotes a copying unit which allows dot-data expanded in a given rectangular region on the BMM 1 to be copied into any other rectangular region on the same BMM 1.

Here, to enable the difference between the present invention and the prior art easily understood, the reason why the problem that it has become difficult to maintain the maximum printing speed of the printer 4 will be examined. According to the prior art, a performance of printing is intended to be improved even in the case where the size of a printing paper is equivalent to the maximum size of an available printing paper that can be treated by the printer device 10. In general, this intention is considered to be quite unreasonable.

More specifically, in an almost all the conventional laser printer devices each having a laser printer which is currently put on the market, a printing paper having the size of A3 or B4 in JIS standard can be treated the paper of the maximum size. However, it should be noted that the maximum size of an available paper does not always conform to the size of a printing paper which has the highest frequency in general use of printing. For example, the size of A4 in JIS standard is generally adopted in the majority of printing papers that are actually used, in place of the size of A3 or B4.

In the present invention, by taking the above-mentioned fact into consideration, the size of a paper which allows the printer 4 in the printer device 10 to maintain the maximum printing speed is always designed to be smaller than the maximum size that can be treated by the printer device 10. Further, the BMM 1 is used by dividing the the whole area thereof into a first area for expanding printing data as dot-data and a second area for transferring the thus expanded dot-data. In this way, a deterioration of a performance of printing in the printer device 10 is intended to be suppressed to the minimum.

As shown in FIG. 1, it is deemed that the size of a printing paper (hatched portion, i.e., the size of a first area R1) used for printing the video data is smaller than a half of the whole area used for expanding the printing data of the current page in the BMM 1, as the first case. In this case, at first, the printing data sent from a certain processor to the printer device 10 is expanded in the first area R1 from a position A through a position B on the bit-map memory 1, as corresponding dot-data (expansion process).

Further, at the time when the expansion process for expanding dot-data for one page was finished, the dot-data which has been expanded in the first area R1 on the BMM 1 is copied into a second area R2 from a position C through a position D on the BMM 1, which does not overlap with the first area R1, by means of the copying unit 3. Subsequently, the dot-data which has been copied into the second area R2 is transferred to the printer 4 by means of the data transfer circuit 2 (transfer process). At the same time, the printing data of the next page is expanded in the first area R1 as corresponding dot-data.

If the size of a printing paper is smaller than a half of the maximum size that can be treated by the printer device as in FIG. 1, it becomes possible to obtain the same effect as the case in which two kinds of BMMs are provided, even when the above-mentioned process is carried out by using a single BMM.

Further, as shown in FIG. 2, it is deemed that the size of a printing paper (hatched portion, i.e., the size of a first area R3) used for printing the video data is smaller than the whole area which can be used for expanding the printing data of the current page in the BMM 1, as the second case. In this case, at first, the printing data sent from a certain processor to the printer device 10 is expanded in the first area R3 from a position A through a position C on the bit-map memory 1, as corresponding dot-data (expansion process).

Further, the dot-data which has been expanded in the first area R3 on the BMM 1 is copied into a second area R4 from a position B through a position D on the BMM 1, which overlaps with the first area R3 in one part thereof, by means of the copying unit 3. Subsequently, the dot-data which has been copied into the second area R4 is transferred to the printer 4 by means of the data transfer circuit 2 (transfer process).

On the other hand, the transfer time required for transferring the dot-data existing within the area from a position B through a position C among the whole second area R4 is calculated in advance. Further, at the time when the thus calculated transfer time elapsed, a process for expanding the printing data of the next page as corresponding dot-data is started. Namely, a process for transferring the video data to the printer 4 and a process for expanding the printing data of the next page in the first area R3 are carried out partially in parallel.

If the size of a printing paper is smaller than the maximum size that can be treated by the printer device as in FIG. 2, the time required for expanding the printing data can be reduced even in the case where a single BMM is used. Consequently, according to a technique of the present invention illustrated in FIG. 2, it becomes possible to increase the printing speed, in comparison with the prior art.

In the case where the maximum printing speed of the printer 4 in FIG. 2 is to be maintained, it should be noted that the time required for inhaling a printing paper from a form feeding tray through the inside of the printer device 10. However, in the case where the printing paper is kept inhaled to the inside of the printer device for a long time, in order to shorten such time required for inhaling a printing paper, the quality of printed characters, the life of consumables, and the like may be given a disadvantageous influence.

Therefore, it is desirable not to inhale a printing paper of the next paper from a form feeding tray, before it is confirmed that a process for expanding the printing data in the BMM 1 as corresponding dot-data is completed.

In a technique for controlling printing as shown in FIG. 2, an order analysis for data expansion of the next page is carried out, while the dot-data existing within the area from a position B through a position C is being transferred to a printer 4.

As a result of the order analysis, only when it is detected that the printing data of the current page is finished and that a new page should be used during the time period in which dot-data between a position B and a position C is transferred, the control unit in the printer device 10 instructs the printer 4 to inhale the printing paper of the next page in advance of a process for expanding the printing data of the next page.

By virtue of such a technique, it becomes possible for a process for inhaling a printing paper of the next page and a process for transferring dot-data to the printer 4 to be carried out in parallel, in the condition that the printing paper is prevented from remaining inhaled to the inside of the printer device for a long time. Consequently, according to the technique illustrated in FIG. 2, the printing speed is remarkably increased.

FIG. 3 is a block diagram showing a first preferred embodiment according to the present invention. In this case, a first preferred embodiment of an apparatus for controlling high printing in a printer device is illustrated by incorporating a central processing unit (CPU) 13 functioning as a control unit into a printer device 11.

In FIG. 3, the printer device 11 is connected to a certain processor which is not shown. Further, in the printer device 11, a two-way interface 12 is provided which transfers various data to the processor and also receives the data from the processor.

Further, in FIG. 3, the CPU 13 is mainly constituted by an input/output control unit 13a, a data analysis unit 13b and a printing control unit 13c.

The input/output control unit 13a receives printing data represented in the code format or dot format which is sent from the processor via the two-way interface 12, and stores the printing data in a data buffer 14a within a main memory unit 14 which will be hereinafter described. The data analysis unit 13b analyzes the printing data stored in the data buffer 14a, and converts the printing data to dot-data represented in the format in which the printing data can be actually printed. The printing control unit 13c controls a printer mechanism 18 which is substantially equivalent to the printer 4 shown in FIG. 1 or FIG. 2, and also controls a timer 19 which notifys the CPU 13 of the completion of a process for expanding the dot-data, and the like.

Further, in FIG. 3, the main memory unit 14 always includes the above-mentioned input/output control unit 13a, the data analysis unit 13b, the printing control unit 13c, and the like, in a form of processing program s. Further, the main memory unit 14 includes the data buffer 14a indicating a region in which the printing data sent from the processor is stored.

Further, in FIG. 3, 15 denotes a bit-map memory (BMM) which corresponds to the BMM 1 shown in FIG. 1 or FIG. 2, and which stores the dot-data represented in the format in which the printing data can be actually printed. 16 denotes a drawing LSI (Large Scale Integrated Circuit) which corresponds to the copying unit 3 shown in FIG. 1 or FIG. 2, and which allows the dot-data expanded in a given rectangular region on the BMM 15 to be copied into any other rectangular region on the same BMM 15. Also, the drawing LSI 16 operates to transfer the dot-data in the BMM 15 to the printer mechanism 18 which prints the thus transferred dot-data in papers of the designated size. 17 denotes a dot-data transfer circuit which corresponds to the data transfer circuit 2 shown in FIG. 1 or FIG. 2, and which allows the dot-data in the BMM 15 to be transferred as video data from at least two positions on the BMM 15 to the printer mechanism 18.

Figure 4:
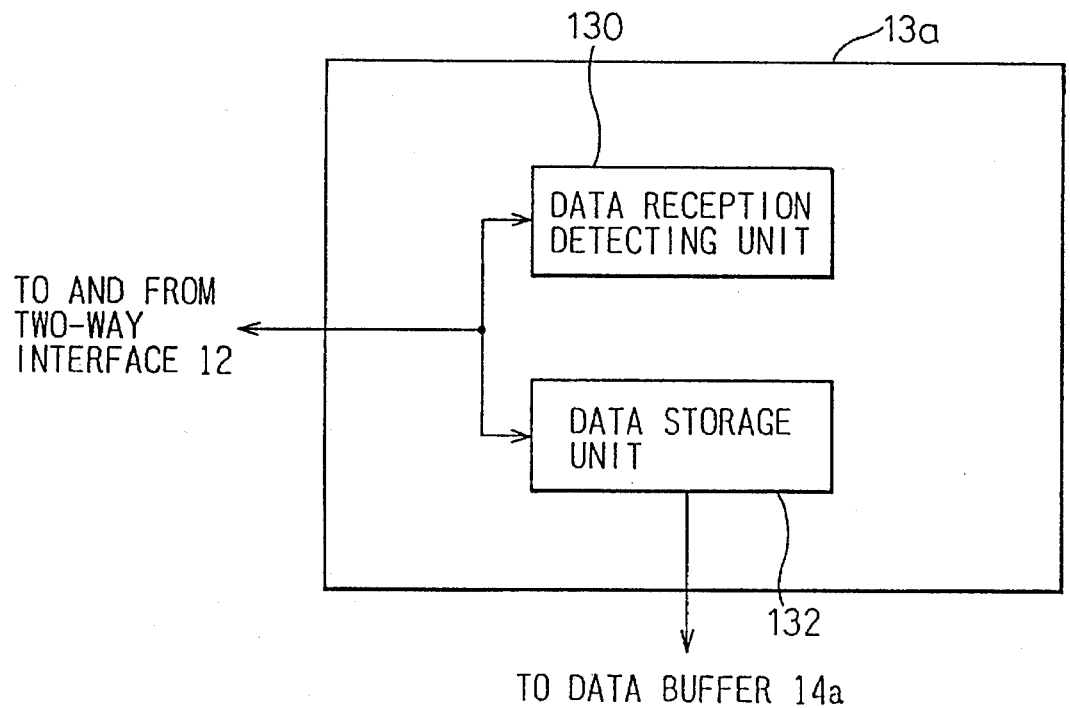
FIG. 4 is a block diagram showing in detail a configuration of an input/output control unit in FIG. 3.
Figure 5:
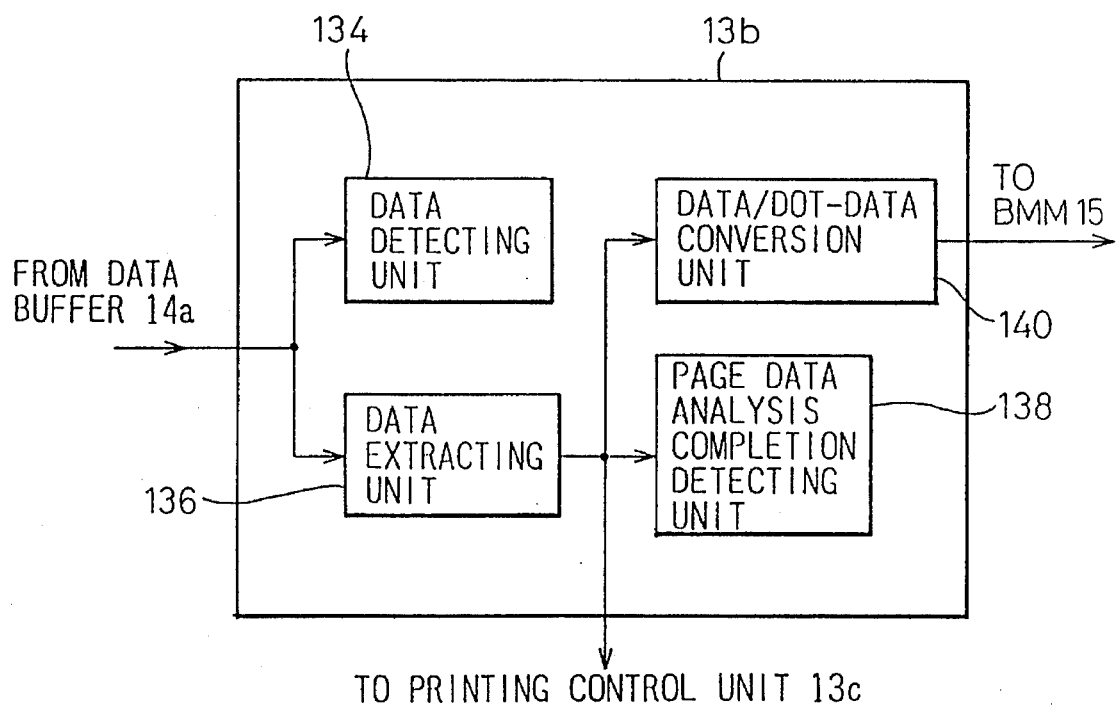
FIG. 5 is a block diagram showing in detail a configuration of a data analysis unit in FIG. 3.
Figure 6:
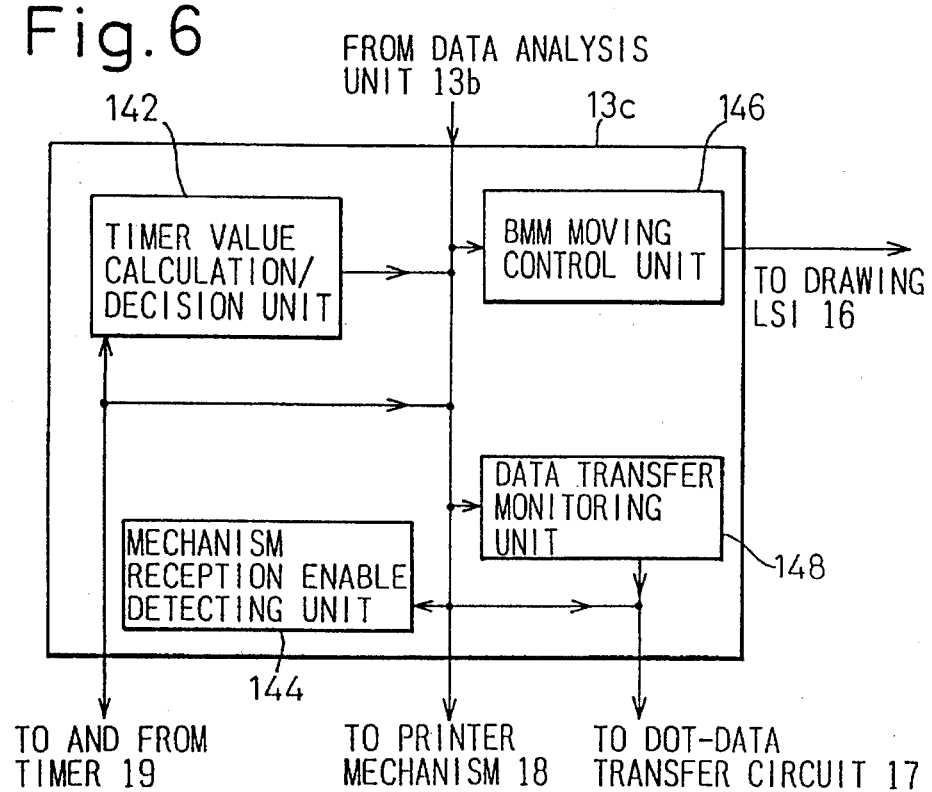
FIG. 6 is a block diagram showing in detail a configuration of a printing control unit in FIG. 3.

FIG. 4 is a block diagram showing in detail a configuration of an input/output control unit in FIG. 3; FIG. 5 is a block diagram showing in detail a configuration of a data analysis unit in FIG. 3; and FIG. 6 is a block diagram showing in detail a configuration of a printing control unit in FIG. 3. Hereinafter, any component which is the same as that mentioned before will be referred to using the same reference number.

In FIG. 4, the input/output control unit 4 includes a data reception detecting unit 130 and a data storage unit 132.

The data reception detecting unit 130 checks whether or not printing data which has been sent from the two-way interface 12 is received. If the reception of the printing data is confirmed by the data reception detecting unit 130, the data storage unit 132 temporarily stores the printing data and then transfers the same printing data to the data buffer 14a. At the same time, the data reception detecting unit 130 informs the data analysis unit 13b that the printing data is assuredly received.

These data reception detecting unit 130 and data storage unit 132 can be preferably realized by processing programs in the CPU 13.

In FIG. 5, the data analysis unit 13b includes a data detecting unit 134, a data extracting unit 136, a data/dot-data conversion unit 140, and a page data analysis completion detecting unit 138.

The data detecting unit 134 examines whether or not there is the printing data in which an order analysis is to be carried out for the next page. If there is such printing data, the data extracting unit 136 takes out printing data from the data buffer 14a. Further, the data/dot-data conversion unit 140 converts the printing data taken out from the data buffer 14a to the corresponding dot-data. Further, an order analysis for data/dot-data conversion and data expansion of the next page is carried out.

In accordance with a result of the above-mentioned order analysis, the page data analysis completion detecting unit 138 checks whether or not a data analysis for one page is finished and that a new page should be used. If it is confirmed that the data analysis for one page is finished, the page data analysis completion detecting unit 138 notifys the printing control unit 13c of the completion of the data analysis for one page.

These data detecting unit 134, data extracting unit 136, data/dot-data conversion unit 140, and page data analysis completion detecting unit 138 can be preferably realized by processing programs in the CPU 13.

In FIG. 6, the printing control unit 13c includes a timer value calculation/decision unit 142, a mechanism reception enable detecting unit 144, a BMM moving control unit 146, and a data transfer monitoring unit 148.

The timer value calculation/decision unit 142 calculates the time required for transferring the dot-data existing within the area between a position B and a position C to the printer mechanism 18, and determines the timer value of the timer 19. Subsequently, the timer 19 is set to the thus determined timer value corresponding to the transfer time of the dot-data in the area between a position B and a position C.

On the other hand, the BMM moving control unit 146 activates the drawing LSI 16, and instructs this drawing LSI 16 to copy a portion from a position A through a position C on the BMM 15 into a portion from a position B through a position D on the same BMM 15.

The mechanism reception enable detecting unit 144 checks whether or not a printing process of the previous page is finished in the printer mechanism 18, and whether or not the dot-data existing within the area between a position B and a position D is ready to be received. When it is confirmed that the the dot-data in the area between a position B and a position D can be received by the printer mechanism 18, the dot-data transfer circuit 17 starts transferring the expanded dot-data to the printer mechanism 18.

The data transfer monitoring unit 148 checks whether or not a time-out signal, indicating the completion of a process for transferring the dot-data in the area between a position B and a position C to the printer mechanism 18, is generated. If it is confirmed that the time-out signal is generated, printing data of the next page is converted to corresponding dot-data and expanded in the BMM 15, in the case where the unprinted data is left.

These timer value calculation/decision unit 142, mechanism reception enable detecting unit 144, BMM moving control unit 146, and data transfer monitoring unit 148 can be preferably realized by processing programs in the CPU 13.

Figure 7:
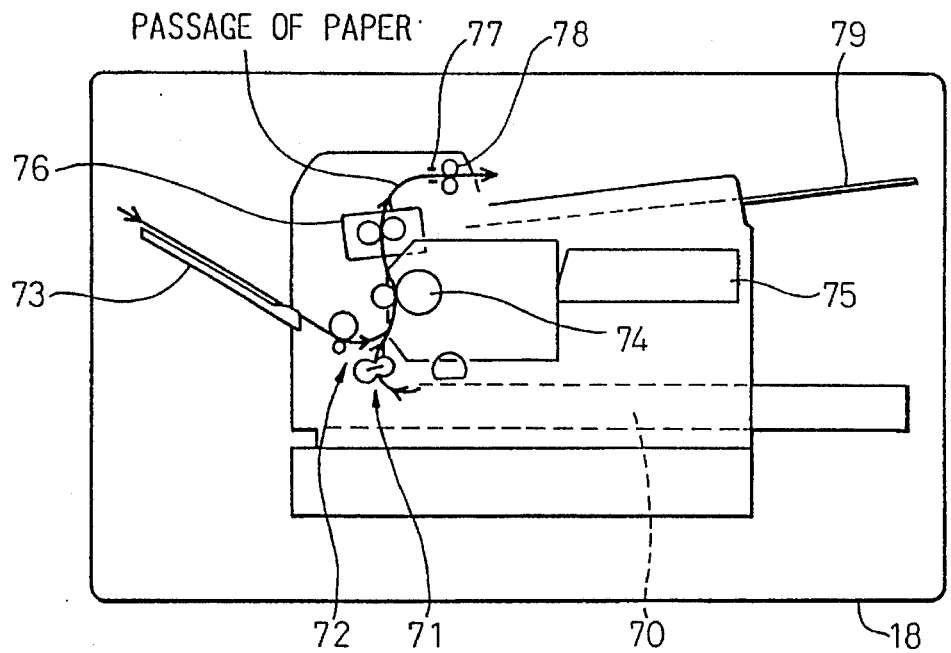
FIG. 7 is a schematic front view showing in detail a construction of a printer mechanism in FIG. 3.

Here, to enable the mechanism in which a paper is inhaled from a form feeding tray easily understood, a front view of the construction of the printer mechanism 18 in FIG. 3 will be illustrated in FIG. 7.

In FIG. 7, in accordance with a command from the printing control unit 13c (FIG. 3 or FIG. 6), a printing paper is automatically picked up from a form feeding tray 70, and a heading process of the printing paper is executed. Further, the printing paper passes through an inhalation sensing unit 71 and a photoresist roller 72, and moves upward along a predetermined passage of the printing paper. Alternatively, the printing paper is thrown into a passage of the printing paper from a form feeding guide 73 by a manual operation.

Either the printing paper automatically picked up or the printing paper thrown into the inside of the printer mechanism 18 by a manual operation is transferred to a photosensitive drum 74. Further, the printing paper is developed by utilizing a photosensitive drum 74 and an optical unit 75. Further, the thus developed paper passes through a fixing unit 76. Subsequently, the desired paper in which a printing process has been completely carried out is detected by an exhaustion sensing unit 77, and finally exhausted from a an exhaustion roller 78 to a stacker 79.

As apparent from FIG. 7, so-called spare time is usually generated, since the printing paper has to be picked up from the form feeding tray 70 through the inside of the printer mechanism 18. The present invention is adapted to shorten the spare time by adjusting the time when the the printing paper is inhaled from the form feeding tray 70.

Figure 8:
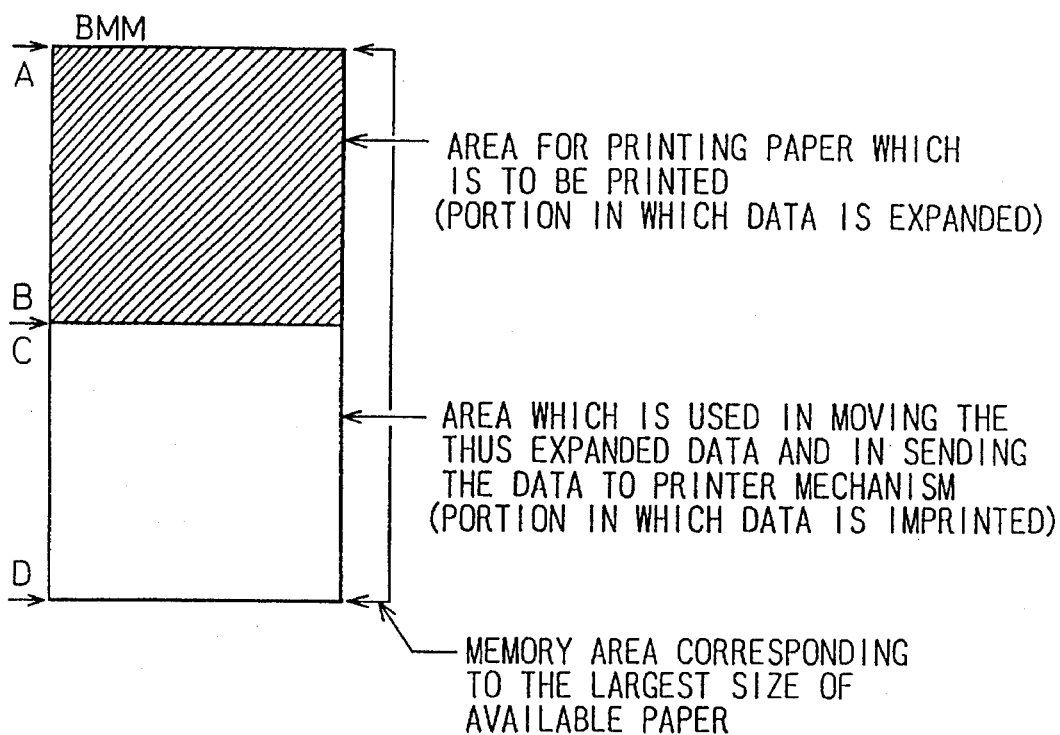
FIG. 8 is a diagram for explaining the condition in which a bit-map memory is used in FIG. 1.
Figure 9:
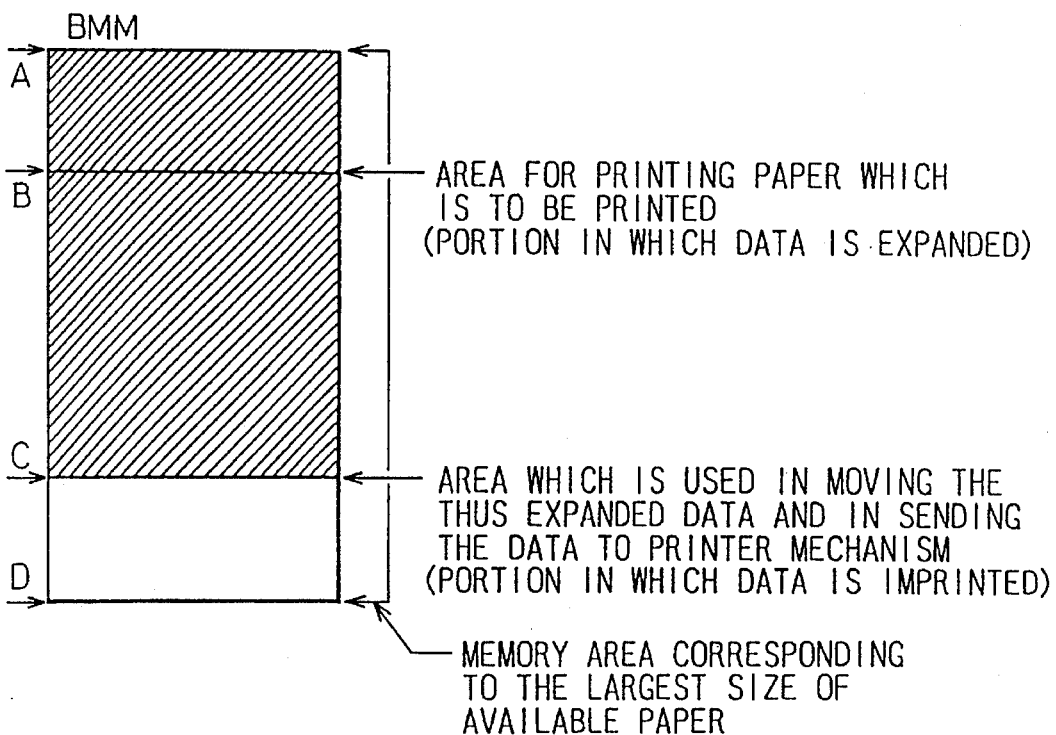
FIG. 9 is a diagram for explaining the condition in which a bit-map memory is used in FIG. 2.

FIG. 8 is a diagram for explaining the condition in which a bit-map memory is used in FIG. 1; and FIG. 9 is a diagram for explaining the condition in which a bit-map memory is used in FIG. 2.

In each of FIG. 8 and FIG. 9, a hatched portion represents an area for printing which is to be printed, i.e., a portion in which dot-data is expanded.

More specifically, in FIG. 8, the size of a printing paper which is used for printing video data, corresponding to the hatched portion, i.e., the size of a first area from a position A through a position B on a BMM 15 (FIG. 3), is smaller than a half of the whole area used for expanding the printing data of the current page in the BMM 15, as corresponding dot-data. The whole memory area indicates a memory area from a position A through a position D, corresponding to the largest (maximum) size of an available paper.

On the other hand, in FIG. 9, the size of a printing paper corresponding to the hatched portion, i.e., the size of a first area from a position A through a position C on the BMM 15 is smaller than the whole area which can be used for expanding the printing data of the current page, but larger than a half of the whole area. The whole memory area also indicates a memory area from a position A through a position D, corresponding to the maximum size of an available paper.

In the first case, with reference to FIG. 8, an operation of an apparatus for controlling high speed printing in a printer device according to a first embodiment of the present invention will be described.

When a CPU 13 of the printer device is notified that printing data is sent from a certain processor, an input/output control unit 13a in the CPU 13 instructs a two-way interface 12 to receive the printing data. Further, the input/output control unit 13a stores the thus received printing data in a data buffer 14a.

A data analysis unit 13b always monitors the data buffer 14a. Whenever the printing data is stored in a data buffer 14a, the data analysis unit 13b takes out the printing data from the data buffer 14a, and executes a process for expanding the printing data in a BMM 15 as corresponding dot-data.

In this case, the size of a printing paper is smaller than a half of the maximum size that can be treated by the printer device, as described before. Therefore, as shown in FIG. 8, the dot-data is expanded in a portion of the BMM 15 that is equal to or smaller than a memory area ranging from a position A through a position B.

Further, a printing control unit 13c checks whether or not a printing process of the previous page is finished in the printer mechanism 18. As soon as it is confirmed that the above-mentioned process is finished, the printing control unit 13c activates a drawing LSI 16, and instructs this drawing LSI 16 to move the expanded dot-data from a portion between a position A and a position B on the BMM 15 to a portion between a position C and a position D on the same BMM 15. Subsequently, the printing control unit 13c instructs the printer mechanism 18 to start a printing process, and waits for a notice, that the printer mechanism 18 has been ready to receive the dot-data, to be sent from the printer mechanism 18.

When the printing control unit 13c is notified that the printer mechanism 18 has been ready to receive the dot-data, the printing control unit 13c instructs the dot-data transfer circuit 17 to start transferring the dot-data stored in the BMM 15 to the printer mechanism 18.

At this time, any dot-data is not stored in a portion between a position A and a position B on the BMM 15. Therefore, it becomes easily possible to expand printing data of the next page without causing any problem.

Further, the printing control unit 13c inquires of the data analysis unit 13b whether or not there is the printing data of the next page. When it is confirmed that there is the printing data of the next page, the printing control unit 13c instructs the dot-data transfer circuit 17 and the data analysis unit 13b to carry out in parallel a process for transferring the dot-data between a position C and a position D to the printer mechanism 18 and a process for expanding the printing data of the next page in a portion between a position A and a position B on the BMM 15.

Subsequently, the data analysis unit 13b can assuredly expand the printing data of the next page to a first area between a position A and a position B, which does not overlap with a second area between a position C and a position D.

In the second case, with reference to FIG. 9, an operation of an apparatus for controlling high speed printing in a printer device according to a first embodiment of the present invention will be described.

The operation of the second case, that is carried out during the time period between the time when the CPU 13 of the printer device is notified that printing data is sent from a certain processor and the time when the data analysis unit 13b starts to execute a process for expanding the printing data in the BMM 15 as corresponding dot-data, is similar to the operation of the second case described before.

In this case, the size of a printing paper is smaller than the maximum size that can be treated by the printer device, but larger than a half of the maximum size, as described before. Therefore, as shown in FIG. 9, the dot-data is expanded in a portion of the BMM 15 that corresponds to a memory area ranging from a position A through a position C.

Further, a printing control unit 13c checks whether or not a printing process of the previous page is finished in the printer mechanism 18. As soon as it is confirmed that the above-mentioned process is finished, the printing control unit 13c activates a drawing LSI 16, and instructs this drawing LSI 16 to move the expanded dot-data from a portion between a position A and a position C on the BMM 15 to a portion between a position B and a position D on the same BMM 15.

In this case, a data transfer rate, in which the expanded dot-data is transferred as video data from the BMM 15 to the printer mechanism 18, is determined by the maximum speed of the printer mechanism 18. Therefore, it becomes possible to calculate in advance the transfer time required for transferring the dot-data existing between a position B and a position C on the BMM 15.

In view of this point, the printing control unit 13c can easily calculate the transfer time of the dot-data existing between a position B and a position C on the BMM 15. Subsequently, the printing control unit 13c instructs the printer mechanism 18 to start a printing process, and waits for a notice, that the printer mechanism 18 has been ready to receive the dot-data, to be issued from the printer mechanism 18.

When the printing control unit 13c is notified that the printer mechanism 18 has been ready to receive the dot-data, the printing control unit 13c instructs the dot-data transfer circuit 17 to start transferring the dot-data which is stored in a portion between a position B and a position D of the BMM 15 (i.e., a portion in which data is to be expanded) to the printer mechanism 18.

At the same time, the printing control unit 13c sets a timer 19 with the timer value corresponding to the precalculated transfer time required for transferring the dot-data existing between a position B and a position C. Further, the printing control unit 13c instructs the timer 19 to generate a time-out signal, in the case where the predetermined time equivalent to the above-mentioned timer value has elapsed.

A process for transferring the dot-data stored in the BMM 15 to the printer mechanism 18 is continuously carried out. When the transfer of the dot-data existing between a position B and a position C on the BMM 15 is finished, the timer 19 generates the time-out signal to notify the printing control unit 13c of the completion of the transfer of the dot-data between a position B and a position C.

At this time, it should be noted that a process for transferring the dot-data existing between a position C and a position D on the BMM 15 (i.e., the dot-data existing in a portion in which data is to be imprinted) to the printer mechanism 18 still continues to be executed.

In such a condition, the transfer of the dot-data existing between a position B and a position C on the BMM 15 is finished, and therefore any dot-data is not stored in a portion between a position A and a position C on the BMM 15. Therefore, it becomes easily possible to expand printing data of the next page without causing any problem.

When the printing control unit 13c is notified by the timer 19 of the completion of the transfer of the dot-data between a position B and a position C, the printing control unit 13c inquires of the data analysis unit 13b whether or not there is the printing data of the next page. When it is confirmed that there is the printing data of the next page, the printing control unit 13c instructs the data analysis unit 13b to carry out a process for expanding the printing data of the next page. In this case, the printing control unit 13c issues the above-mentioned instruction without waiting for a process for transferring the dot-data between a position C and a position D to be completed.

Subsequently, the data analysis unit 13b can also expand the printing data of the next page to a first area between a position A and a position C.

FIG. 10 is a time chart for explaining an operation of a data analysis unit and a printing control unit in the case of FIG. 9. In this case, the sequential operation in the second case will be explained with reference to FIG. 10.

During time period T1 of FIG. 10, printing data of the page #1 is expanded in the BMM 15 by means of the data analysis unit 13b. When a data analysis for one page is completed, the printing control unit 13c activates a drawing LSI 16 and instructs this drawing LSI 16 to move the expanded dot-data from a portion between a position A and a position C on the BMM 15 to a portion between a position B and a position D on the same BMM 15 (time period T2).

Subsequently, a process for transferring video data from the BMM 15 to the printer mechanism 18 is executed in accordance with an instruction by the printing control unit 13c (time period T3+T1). When the transfer of the dot-data between a position B and a position C is finished, the timer 19 generates the time-out signal to notify the printing control unit 13c of the completion of the transfer of the dot-data between a position B and a position C. In this case, printing data of the page #2 is expanded in the BMM 15 by means of the data analysis unit 13b, in parallel with the transfer of the video data between a position C and a position D (time period T1).

Further, when a data analysis for one page is completed, the above-mentioned process is repeated (time period T2).

FIG. 11 is a flowchart for explaining a first part of a procedure for controlling printing in the case of FIG. 9; FIGS. 12A and 12B are flowcharts for respectively explaining a second part and a third part of a procedure for controlling printing in the case of FIG. 9; and FIGS. 13A and 13B are flowcharts for respectively explaining a fourth part and a fifth part of a procedure for controlling printing in the case of FIG. 9.

In this case, a sequential procedure of the first preferred embodiment carried out in the second case as described in FIGS. 9 and 10 will be explained with reference to FIGS. 11, 12A, 12B, 13A and 13B.

In a step S1 of FIG. 11, the input/output control unit 13a checks whether or not the printing data is received from a certain processor. If it is confirmed that the printing data is received, in a step S2, the input/output control unit 13a stores the printing data in a data buffer 14a. In the case where the printing data is stored in the input/output control unit 13a, in a step S3, the data analysis unit 13b takes out the printing data from the data buffer 14a. Further, in a step S4, the data analysis unit 13b expands the printing data in the BMM 15, as corresponding dot-data.

Further, in a step S5, it is determined whether or not the data analysis for one page is completed. If it is confirmed that the data analysis for one page is completed, the procedure proceeds to a step S6 of FIG. 12A. In the step S6, the printing control unit 13c checks whether or not a printing process of the previous page is finished in the printer mechanism 18.

As soon as it is confirmed that the above-mentioned process is finished (in the condition that the current page is not a head page), in a step S7, the printing control unit 13c activates a drawing LSI 16, and instructs this drawing LSI 16 to copy a portion between a position A and a position C on the BMM 15 to a portion between a position B and a position D on the same BMM 15.

Further, in a step S8 of FIG. 12B, the printing control unit 13c calculates the time required for emptying a memory area between a position B and a position C on the BMM 15. Further, in a step S9, the printing control unit 13c instructs the printer mechanism 18 to start printing the video data.

Subsequently, in a step S10, the printing control unit 13c waits for a notice, that the printer mechanism 18 has been ready to receive the dot-data, to be issued from the printer mechanism 18.

When the printing control unit 13c is notified that the printer mechanism 18 has been ready to receive the dot-data, the procedure proceeds to a step S11 of FIG. 13A. In the step S11, the printing control unit 13c instructs hardware for dot-data transfer, e.g., the dot-data transfer circuit 17 to start transferring the dot-data which is stored in a portion between a position B and a position D on the BMM 15 to the printer mechanism 18.

Further, in a step S12, the printing control unit 13c sets a timer 19 with the timer value corresponding to the precalculated transfer time required for transferring the dot-data between a position B and a position C to the printer mechanism 18.

Further, in a step S13 of FIG. 13B, the printing control unit 13c checks whether or not the time-out signal is generated from the timer 19.

When it is confirmed that the time-out signal is generated (i.e., when the transfer of the dot-data existing between a position B and a position C on the BMM 15 is finished), in a step S14, the data analysis unit 13b determines whether or not the unprinted data, in which a printing process is not yet executed, is left. In the case where the unprinted data is left, the procedure goes back to the step S4 of FIG. 11 and repeats the above-mentioned steps S4 to S13.

On the other hand, in the case where the unprinted data is not left, the procedure proceeds to a step S15. In the step S15, the printing control unit 13c checks whether or not the transfer of the dot-data between a position C and a position D on the BMM 15 is finished in the printer mechanism 18. When it is notified by the above-mentioned hardware that the transfer of the dot-data between a position C and a position D is finished, every procedure for controlling printing ends.

In the first preferred embodiment of the present invention, the size of a paper which enables the printer mechanism of the printer device to maintain the maximum printing speed is designed to be smaller than the maximum size that can be treated by the printer device.

Further, the BMM is used by dividing the the whole area thereof into a first area for expanding printing data as dot-data and a second area for transferring the thus expanded dot-data. Therefore, a deterioration of a performance of printing in the printer device can be suppressed to the minimum.

More specifically, in the first case where the size of a printing paper is smaller than a half of the maximum size that can be treated by the printer device, a process for expanding the printing data and a process for transferring the dot-data to the printer mechanism can be carried out in parallel. Therefore, it becomes possible for a printing speed as high as the case in which two kinds of BMMs are provided to be obtained by using a single BMM 15.

On the other hand, in the second case where the size of a printing paper is smaller than the maximum size that can be treated by the printer device, but larger than a half of the maximum size, the time required for transferring the dot-data between a position C and a position D can be applied to the time required for expanding the dot-data in the BMM 15. Therefore, it becomes possible to reduce the time required for expanding the dot-data and to improve a printing speed (a performance of printing), in comparison with the prior art.

When the maximum printing speed of the printer mechanism is to be maintained, it should be noted that the time required for inhaling a printing paper from a form feeding tray through the inside of the printer device is not be negligible. Generally, unless the inhalation of the printing paper of the next page and the transfer of the dot-data to the printer mechanism are executed in parallel, it is difficult for the maximum printing speed of the printer mechanism to be fully utilized.

Further, the printing paper, which has been once inhaled to the inside of the printer mechanism from a form feeding tray, cannot return to the form feeding tray. Further, it may have a disadvantageous influence on the quality of printed characters, the life of consumables, and the like, that the printing paper is kept inhaled to the inside of the printer device for a long time. Therefore, it is generally desirable not to inhale a printing paper of the next paper from the form feeding tray, before it is confirmed that a process for expanding printing data in the BMM is completed.

According to the first preferred embodiment, in the above-mentioned first case, a process for expanding the printing data and a process for transferring the dot-data to the printer mechanism are carried out completely in parallel, as described above. In the case where the transfer of the dot-data to the printer mechanism is not finished, at the time when the expansion of the dot-data of the next page is finished, the printing control unit instructs the printer mechanism to inhale the printing paper of the next page.

On the other hand, in the above-mentioned second case, a process for expanding the printing data of the next page, and a process for transferring the dot-data in the part of the area which does not overlap with the area in which the printing data of the next page is to be expanded to the printer mechanism, are carried out partially in parallel, as described above.

In this case, while the dot-data between a position B and a position C on the BMM is transferred to the printer mechanism, the expansion of the dot-data in the BMM cannot be executed. Accordingly, during the above-mentioned time period, only an order analysis, in which the time required for expanding the dot-data of the next page is analyzed in advance of the expansion of the dot-data, is carried out. Only when it is detected that a new page should be used as a result of the data analysis, the printing control unit instructs the printer mechanism to inhale the printing paper of the next page in advance of the process for expanding the printing data of the next page.

By virtue of such a technique, it becomes possible, for a process for inhaling the printing paper of the next page and a process for transferring the dot-data in the part of the area which overlaps with the area in which the printing data of the next page is to be expanded to the printer mechanism, to be carried out in parallel, in the condition that the printing paper is prevented from remaining inhaled to the inside of the printer device for a long time.

Heretofore, in the first preferred embodiment, a sequential procedure for controlling printing and an operation of the inhalation of the printing paper in each of the first and second case have been described. However, as a modification of the preferred embodiment, it may be possible for any one of the procedures for controlling printing, or any one of the operations of the inhalation of the printing paper, to be automatically selected by means of a CPU, on the basis of the size of the printing paper. In this modification, it is preferable for the CPU to select the most advantageous procedure, etc., by taking the performance of the printer device and the cost for production into consideration.

Figure 14:
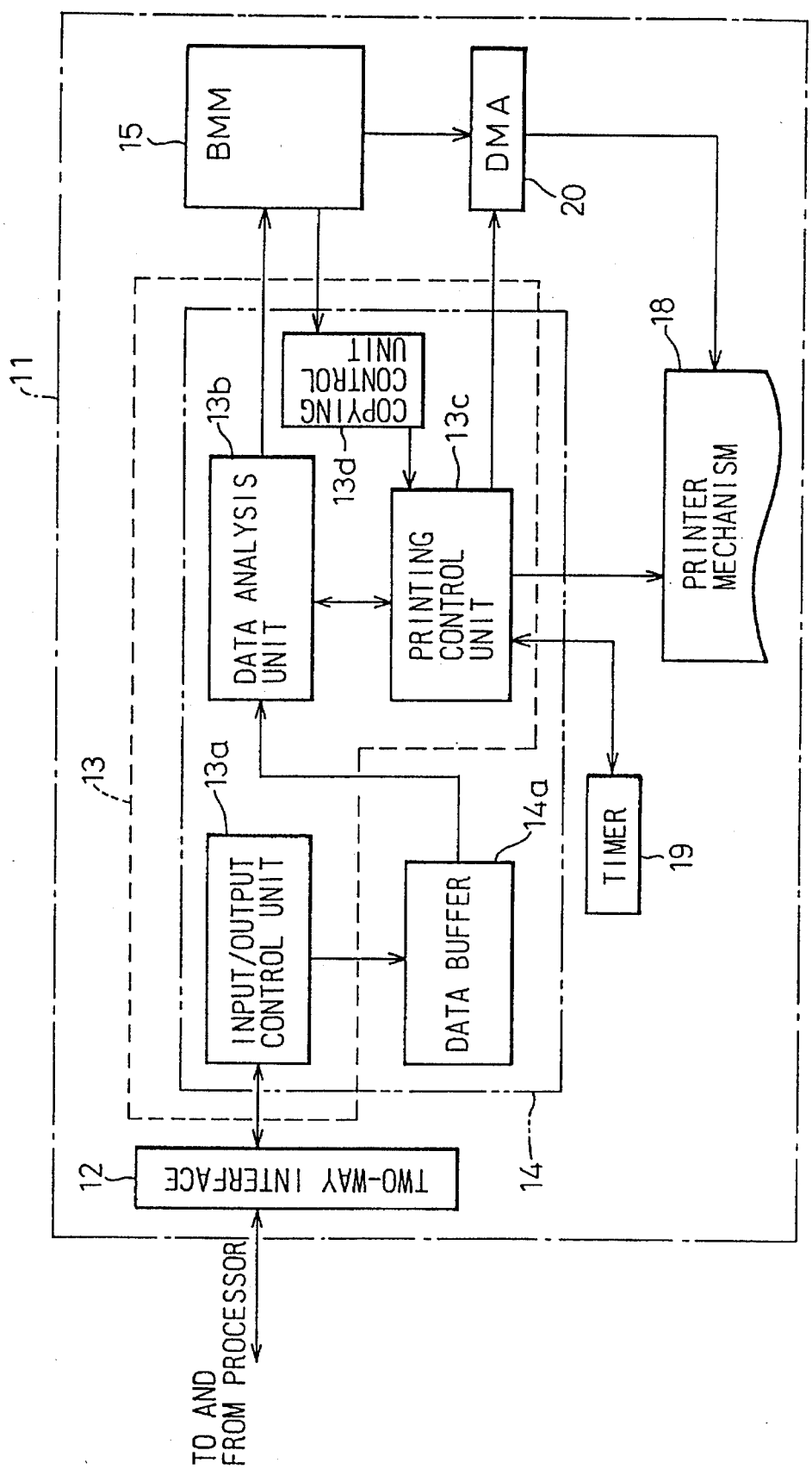
FIG. 14 is a block diagram showing a second preferred embodiment according to the present invention.

FIG. 14 is a block diagram showing a second preferred embodiment according to the present invention.

In FIG. 14, a copying control unit 13d is provided in the CPU 13, in place of the drawing LSI of the first preferred embodiment shown in FIG. 3. In the second preferred embodiment, by utilizing processing programs in the main memory 14, a process for copying the dot-data is designed to be carried out.

Further, in FIG. 14, a direct memory access (DMA) unit 20 is used as a means for transferring the dot-data to the printer mechanism 18, in place of the dot-data transfer circuit 17 of the first preferred embodiment.

Any other component except the copying control unit 13d and the DMA unit 20 is substantially the same as that of the first preferred embodiment. Since the the DMA unit 20 is provided in the second preferred embodiment, this second embodiment is more advantageous in treating a large amount of data with high transfer rate.

In general, an apparatus and method for controlling high speed printing according to the second preferred embodiment has substantially the same advantages as the case of the first preferred embodiment.

Further, in each of the first and second preferred embodiments, a BMM is effectively utilized by moving the dot-data in the BMM in the upper and lower directions. However, the construction of BMM of the present invention is not limited to that of the above-mentioned BMM. For example, even in the case where the dot-data in the BMM is moved in the right and left directions, the same effect as the BMM in each of the first and second embodiments can be expected.

Further, in each of the first and second preferred embodiments, a hardware timer is used as the timer in the printer device. However, even in the case where the number of loops counted by internal programs is adequately processed by utilizing a counter included in the CPU, an operation equivalent to that of the hardware timer can be carried out.

Further, in each of the first and second preferred embodiments, a two-way interface unit is used as the interface means between a host processor and a printer device. However, the construction of interface means of the present invention is not limited to that of the above-mentioned two-way interface unit. For example, it may be possible to use two kinds of one-way interface units.

Further, in each of the first and second preferred embodiments, only one CPU is used for controlling high printing. However, a data analysis unit may be constituted by a different independent CPU, so as to reduce the time required for expanding dot-data in the BMM. Namely, the present invention can be also applied to a printer device having a plurality of CPU.

While the present invention has been described as related to the preferred embodiments, it will be understood that various changes and modifications may be made without departing from the spirit and the scope of the invention as hereinafter claimed.

We claim:

1. A method for controlling high speed printing in a printer device which has:

a bit-map memory which generates dot-data which can be output as necessary video data, on the basis of printing data which is to be printed;

a data transfer circuit which allows video data to be transferred from at least two positions on said bit-map memory to a printer constituting a mechanical part of said printer device; and a copying unit which allows said dot-data existing within a given rectangular region on said bit-map memory to be copied into any other rectangular region on said bit-map memory, wherein said method includes:

a step of copying said dot-data which is expanded in a first area on said bit-map memory into a second area that does not overlap with said first area; and a step of sending the thus copied dot-data to said printer as said video data, and simultaneously, expanding the printing data of the next page in said first area, and wherein a process for transferring said video data to said printer and a process for expanding the printing data of the next page in said first area are adapted to be carried out substantially in parallel.

2. A method for controlling high speed printing in a printer device which has:

a bit-map memory which generates dot-data which can be output as necessary video data, on the basis of printing data which is to be printed;

a data transfer circuit which allows video data to be transferred from at least two positions on said bit-map memory to a printer constituting a mechanical part of said printer device; and a copying unit which allows said dot-data existing within a given rectangular region on said bit-map memory to be copied into any other rectangular region on said bit-map memory, wherein said method includes:

a step of copying said dot-data which is expanded in a first area on said bit-map memory into a second area that overlaps with said first area in at least one part thereof;

a step of sending the thus copied dot-data in the part of said second area which overlaps with said first area to said printer as said video data; and a step of sending the thus copied dot-data in the part of said second area which does not overlap with said first area to said printer as said video data, and expanding the printing data of the next page in said first area, and wherein a process for transferring said video data in the part of said second area which does not overlap with said first area to said printer and a process for expanding the printing data of the next page in said first area are adapted to be carried out partially in parallel.

3. A method as set forth in claim 2, wherein an analysis for data expansion of the next page is executed during the time period between the time when said process for transferring said video data to said printer is started and the time when said process for expanding the printing data of the next page in said first area is allowed to be executed, wherein, in the case where it is detected that a new page should be used within said time period as a result of said analysis, a paper of the next page is inhaled in advance of said process for expanding the printing data of the next page, and wherein a process for inhaling a paper of the next page and said process for transferring said video data to said printer are adapted to be carried out in parallel.

4. A method for controlling high speed printing in a printer device which has:

a bit-map memory which generates dot-data which can be output as necessary video data, on the basis of printing data which is to be printed;

a data transfer circuit which allows video data to be transferred from at least two positions on said bit-map memory to a printer constituting a mechanical part of said printer device; and a copying unit which allows said dot-data existing within a given rectangular region on said bit-map memory to be copied into any other rectangular region on said bit-map memory, wherein, in accordance with the size of a printing paper which is used for printing said video data and the whole area which can be used for expanding the printing data of the current page in said bit-map memory as corresponding dot-data, at least one procedure is adapted to be selected among the following three types of procedures (A), (B) and (C):

(A) a first procedure comprising a step of copying said dot-data which is expanded in a first area on said bit-map memory into a second area that does not overlap with said first area, and a step of sending the thus copied dot-data to said printer as said video data, and simultaneously, expanding the printing data of the next page in said first area, a process for transferring said video data to said printer and a process for expanding the printing data of the next page in said first area being carried out substantially in parallel;

(B) a second procedure comprising a step of copying said dot-data which is expanded in a first area on said bit-map memory into a second area that overlaps with said first area in at least one part thereof, a step of sending the thus copied dot-data in the part of said second area which overlaps with said first area to said printer as said video data, and a step of sending the thus copied dot-data in the part of said second area which does not overlap with said first area to said printer as said video data, and expanding the printing data of the next page in said first area, a process for transferring said video data in the part of said second area which does not overlap with said first area to said printer and a process for expanding the printing data of the next page in said first area being carried out partially in parallel; and (C) a third procedure comprising a step of executing an analysis for data expansion of the next page during the time period between the time when said process for transferring said video data to said printer is started and the time when said process for expanding the printing data of the next page in said first area is allowed to be executed, and a step of inhaling a paper of the next page in advance of said process for expanding the printing data of the next page, in the case where it is detected that a new page should be used within said time period as a result of said analysis, a process for inhaling a paper of the next page and said process for transferring said video data to said printer being carried out in parallel.

5. A method as set forth in claim 1, wherein said process for transferring said video data and said process for expanding the printing data of the next page are controlled by a central processing unit in a computer system.

6. A method as set forth in claim 2, wherein said process for transferring said video data and said process for expanding the printing data of the next page are controlled by a central processing unit in a computer system.

7. A method as set forth in claim 3, wherein said process for inhaling a paper of the next page, said process for transferring said video data, and said process for expanding the printing data of the next page are controlled by a central processing unit in a computer system.

8. A method as set forth in claim 4, wherein said process for inhaling a paper of the next page, said process for transferring said video data, and said process for expanding the printing data of the next page are controlled by a central processing unit in a computer system.

9. An apparatus for controlling high speed printing in a printer device, comprising:

a bit-map memory which generates dot-data which can be output as necessary video data, on the basis of printing data which is to be printed;

a data transfer circuit which allows video data to be transferred from at least two positions on said bit-map memory to a printer constituting a mechanical part of said printer device;

a copying unit which allows said dot-data existing within a given rectangular region on said bit-map memory to be copied into any other rectangular region on said bit-map memory; and a control unit for controlling operations of said data transfer circuit and said copying unit, wherein said control unit includes:
means for copying said dot-data which is expanded in a first area on said bit-map memory into a second area which does not overlap with said first area; and
means for sending the thus copied dot-data to said printer as said video data, and expanding the printing data of the next page in said first area, and wherein, said control unit allows a process for transferring said video data to said printer and a process for expanding the printing data of the next page in said first area to be carried out substantially in parallel.

10. An apparatus for controlling high speed printing in a printer device, comprising:

a bit-map memory which generates dot-data which can be output as necessary video data, on the basis of printing data which is to be printed;

a data transfer circuit which allows video data to be transferred from at least two positions on said bit-map memory to a printer constituting a mechanical part of said printer device;

a copying unit which allows said dot-data existing within a given rectangular region on said bit-map memory to be copied into any other rectangular region on said bit-map memory; and a control unit for controlling operations of said data transfer circuit and said copying unit, wherein said control unit includes:

means for copying said dot-data which is expanded in a first area on said bit-map memory into a second area which overlaps with said first area in at least one part thereof; and means for sending the thus copied dot-data to said printer as said video data, and expanding the printing data of the next page in said first area, and wherein said control unit allows a process for transferring said video data to said printer and a process for expanding the printing data of the next page in said first area to be carried out partially in parallel.

11. An apparatus as set forth in claim 10, wherein said control unit further includes means for carrying out an analysis for data expansion of the next page during the time period between the time when said process for transferring said video data to said printer is started and the time when said process for expanding the printing data of the next page in said first area is allowed to be executed, and wherein, said printer inhales a paper of the next page in advance of said process for expanding the printing data of the next page, in the case where it is detected that a new page should be used within said time period as a result of said analysis, and wherein said control unit allows a process for inhaling a paper of the next page and said process for transferring said video data to said printer to be carried out in parallel.

12. An apparatus as set forth in claim 9, wherein said control unit is constituted by a central processing unit in a computer system.

13. An apparatus as set forth in claim 10, wherein said control unit is constituted by a central processing unit in a computer system.

14. An apparatus as set forth in claim 11, wherein said control unit is constituted by a central processing unit in a computer system.

* * * * *